US009865178B2

United States Patent
Hewitt et al.

(10) Patent No.: US 9,865,178 B2
(45) Date of Patent: Jan. 9, 2018

(54) SYSTEM AND METHOD FOR TRACKING ARTICLES WITH TACTILE FEEDBACK FOR VISUALLY IMPAIRED SPECTATORS

(71) Applicant: International Business Machines Corporation, Armonk, NY (US)

(72) Inventors: Trudy L. Hewitt, Cary, NC (US); Francesco C. Schembari, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/950,156

(22) Filed: Nov. 24, 2015

(65) Prior Publication Data

US 2017/0148353 A1  May 25, 2017

(51) Int. Cl.
G09B 21/00 (2006.01)

(52) U.S. Cl.
CPC ................... *G09B 21/003* (2013.01)

(58) Field of Classification Search
None
See application file for complete search history.

(56) References Cited

U.S. PATENT DOCUMENTS

| | | | | |
|---|---|---|---|---|
| 5,523,745 | A * | 6/1996 | Fortune | A61F 4/00 340/4.12 |
| 6,326,901 | B1 * | 12/2001 | Gonzales | G08B 6/00 340/4.12 |
| 7,446,669 | B2 * | 11/2008 | Liebermann | G10L 15/26 340/4.1 |
| 7,789,742 | B1 | 9/2010 | Murdock et al. | |
| 8,289,185 | B2 | 10/2012 | Alonso | |
| 8,540,560 | B2 | 9/2013 | Crowley | |
| 2003/0161508 | A1 * | 8/2003 | Lindahl | G09B 21/003 382/123 |
| 2007/0179854 | A1 * | 8/2007 | Ziv | G06F 21/10 705/14.25 |
| 2007/0191098 | A1 * | 8/2007 | An | H04N 5/4401 463/40 |
| 2009/0029754 | A1 | 1/2009 | Slocum et al. | |

(Continued)

FOREIGN PATENT DOCUMENTS

WO    2005028035 A1    3/2005

OTHER PUBLICATIONS

Accessibility—iOS—Braille Displays—Apple, "Braille Displays for iOS" pp. 1-3, [retrieved Oct. 21, 2015]; [retrieved from the Internet]  https://www.apple.com/accessibility/ios/braille-display. html.

(Continued)

*Primary Examiner* — Curtis King
(74) *Attorney, Agent, or Firm* — Cantor Colburn LLP; Richard Wilhelm

(57) ABSTRACT

A method for tracking objects including sensing, with a processor, at least one object, determining, with a processor, a position of the at least one object relative to a portion of a sporting venue, presenting the portion of the sporting venue on a feedback device, and providing, through the feedback device, at least one tactile feedback presenting the position of the at least one object relative to the portion of the sporting venue.

18 Claims, 2 Drawing Sheets

(56) References Cited

U.S. PATENT DOCUMENTS

| | | | | |
|---|---|---|---|---|
| 2009/0124197 | A1* | 5/2009 | Muneomi | H04N 7/17318 455/3.06 |
| 2010/0026809 | A1 | 2/2010 | Curry | |
| 2010/0109918 | A1* | 5/2010 | Liebermann | G10L 15/26 341/21 |
| 2011/0102459 | A1* | 5/2011 | Hall | A63F 13/10 345/633 |
| 2013/0066448 | A1* | 3/2013 | Alonso | H04Q 9/00 700/91 |
| 2014/0128182 | A1 | 5/2014 | Hohteri | |
| 2014/0195019 | A1 | 7/2014 | Thurman et al. | |
| 2014/0256478 | A1 | 9/2014 | Gale | |
| 2014/0340298 | A1* | 11/2014 | Aldossary | G06F 3/016 345/156 |
| 2015/0141085 | A1 | 5/2015 | Nuovo et al. | |
| 2015/0176784 | A1 | 6/2015 | Hu | |
| 2016/0375340 | A1* | 12/2016 | Monari | A63B 71/06 345/474 |

OTHER PUBLICATIONS

Baca et al., "Rapid Feedback Systems for Elite Sports Training", IEEE, 2006, pp. 70-76.

Flatley, Joseph L. "Researchers develop braille for vibrating touchscreen devices", pp. 1-4 [retrieved Oct. 21, 2015]; [retrieved from the Internet] http://www.engadget.com/2009/03/31/researchers-develop-braille-for-vibrating-touchscreen/.

McNicoll, Arion "'Feel' objects in thin air: The future of touch technology" pp. 1-4, [retrieved Oct. 21, 2015], [retrieved from the Internet] http://www.cnn.com/2013/10/29/tech/innovation/feel-objects-in-thin-air/.

New Scientist, "Vibrating touch screen puts Braille at the fingertips", pp. 1-3, published Mar. 25, 2009, [retrieved Nov. 24, 2015], [retrieved from the Internet].

Odiase et al., "Object Shape Characterisation using a Haptic Probe" Abstract, pp. 1-2, [retrieved Nov. 24, 2015], [retrieved from the Internet] http://link.springer.com/chapter/10.1007%2F3-540-26415-9_99#page-1.

Smith et al., "Multimodal Video Characterization and Summarization", Kluwer Academic Publishers, 2005, pp. 1-50.

V-Braille, "About V-Braille" pp. 1-2, [retrieved Oct. 21, 2015] [retrieved from the Internet] http://vbraille.cs.washington.edu/.

Wang et al., "Haptic Rendering for Simulation of Fine Manipulation", Springer, 2014, pp. 1-21.

Woollaston, Victoria "Turn your mobile into an EYEphone: App lets blind people 'see' their surroundings by converting photos into SOUND", DailyMail, pp. 1-15, [retrieved Nov. 24, 2015], [retrieved from the Internet].

Worthen, Ben "In Beep Ball, Umpires Aren't Blind But the Players Are", The Wall Street Journal, pp. 1-5, [retrieved Oct. 21, 2015]; [retrieved from the Internet] http://www.wsj.com/articles/SB125054739963438235.

\* cited by examiner

SYSTEM AND METHOD FOR TRACKING ARTICLES WITH TACTILE FEEDBACK FOR VISUALLY IMPAIRED SPECTATORS

BACKGROUND

The present invention relates to the art of article tracking and, more specifically to an article tracking system that provides tactile feedback to visually impaired spectators.

Sporting events of all kinds are ubiquitous in modern society. Sporting events such as football, baseball, hockey, racing of various forms including vehicles, animals and people, and the like, are viewed by billions of people every year. From the professional level down to children in school, sporting events are popular to people of all ages and all abilities. Unfortunately, visually impaired persons may have difficulty experiencing many sporting events. Following, in real-time, a moving object such as a ball, a puck, a car, or a person, is an integral part of experiencing a sporting event. A visually impaired person must rely upon relayed information from friends, announcers, broadcasters, and the like. As such, a visually impaired person may not experience a sporting event with a similar degree of enthusiasm as a person that can visually track objects

SUMMARY

According to an exemplary embodiment, a method for tracking objects including sensing, with a processor, at least one object, determining, with a processor, a position of the at least one object relative to a portion of a sporting venue, presenting the portion of the sporting venue on a feedback device, and providing, through the feedback device, at least one tactile feedback presenting the position of the at least one object relative to the portion of the sporting venue.

According to another exemplary embodiment, a computer program product for selectively and automatically controlling lights through a television includes a computer readable storage medium having computer readable program code embodied therewith, the computer readable program code, when executed by a processor, causes the processor to sense, with a processor, at least one object, determine, with a processor, a position of the at least one object relative to a portion of a sporting venue, present the portion of the sporting venue on a feedback device, and provide, through the feedback device, at least one tactile feedback presenting the position of the at least one object relative to the portion of the sporting venue.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
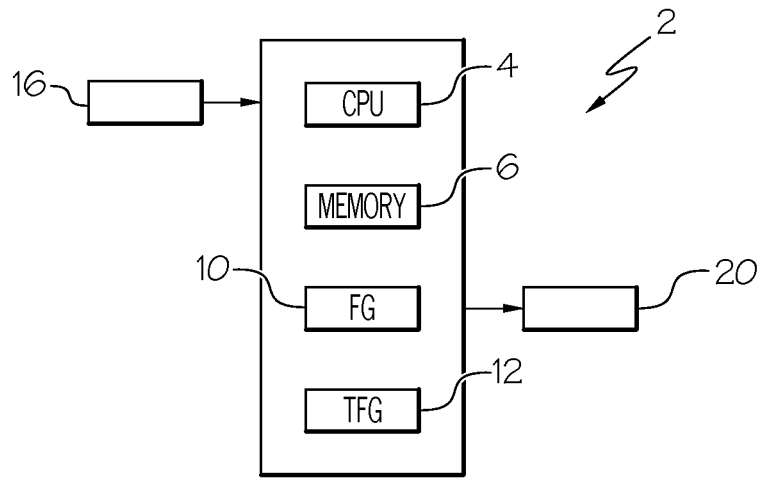
FIG. 1 is a block diagram depicting an object tracking and tactile feedback system for visually impaired spectators, in accordance with an exemplary embodiment.

With reference now to FIG. 1, an object detection and tactile feedback system, in accordance with an exemplary embodiment, is indicated generally at 2. As will be detailed more fully below, object detection and tactile feedback system 2 tracks one or more objects associated with an event, such as a sporting event, and provides haptic feedback to a feedback device. Object detection and tactile feedback system 2 enables a visually impaired person, to follow, in real-time, the object(s) associated with the event. In accordance with an aspect of an exemplary embodiment, object detection and tactile feedback system 2 includes a processor 4 operatively connected to a non-volatile memory 6. As will be detailed more fully below, non-volatile memory 6 may store preferred sporting venues, haptic feedback preferences, and the like.

At this point, it should be understood, that the term "sporting venue" may include football fields, soccer pitches, basketball courts, baseball fields, track venues, ice hockey rinks, field hockey rinks, automotive, bicycle, and the like, race tracks, race courses that may be defined by city streets, ski slopes, and the like. That is, a sporting venue may be an indoor venue, an outdoor venue or any venue in which objects such as balls, pucks, vehicles, people, and the like may move as part of a competition. "Sporting venue" should also be understood to include a child's playground and the like.

In further accordance with an exemplary aspect, object detection and tactile feedback system 2 includes a field generator 10 that may provide a depiction of a portion of the sporting venue to a visually impaired user. The depiction may be provided with haptic feedback, may be visual, or combinations thereof presented on a feedback device, as will be detailed more fully below. The portion of the sporting venue may take the form of a playing field, a road course, a track, or the like. Object tracking and tactile feedback system 2 also includes a tactile feedback generator 12, an object position input 16 and a tactile output 20.

Figure 2:
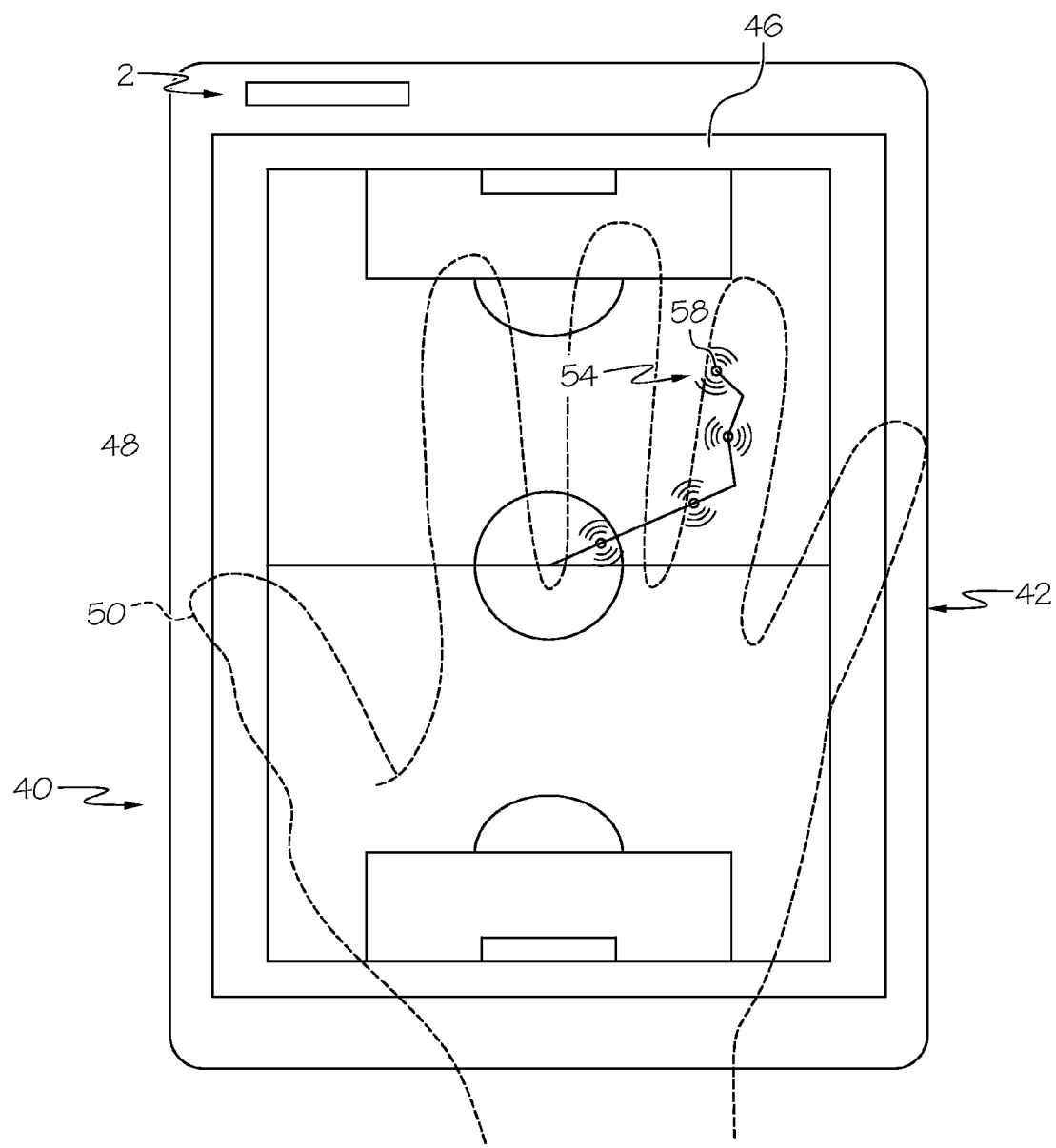
FIG. 2 is a display device including the object tracking and tactile feedback system for visually impaired spectators, in accordance with an exemplary embodiment.

In accordance with an aspect of an exemplary embodiment, object tracking and tactile feedback system 2 may be incorporated into a feedback device, shown in the form of a touchpad display device, such as shown at 40 in FIG. 2. Of course, it should be understood, that the feedback device may take on many forms and should not be considered to being limited to devices with visual displays and/or touch screen devices. Touchpad display device 40 includes a housing 42 that supports a touch screen display 46. Field generator 10 may present a playing field, such as a soccer pitch 48, on touch screen display 46. Soccer pitch 48 may be presented visually, and/or depicted as a series of haptic outputs.

Soccer pitch 48 may be sized to a user's hand 50. Additional details, such as centerlines, field boundaries, goals, and the like, may also be presented as one or more haptic outputs though touch screen display 46. The field may be generated based on stored default fields, through user inputs, available downloads, captured digital images and the like. Once generated, object detection and tactile feedback system 2 provides tactile or haptic feedback, such as shown at 54, which enable a visually impaired person to track objects 58, such as balls, players, and the like relative to various points on the field.

Figure 3:
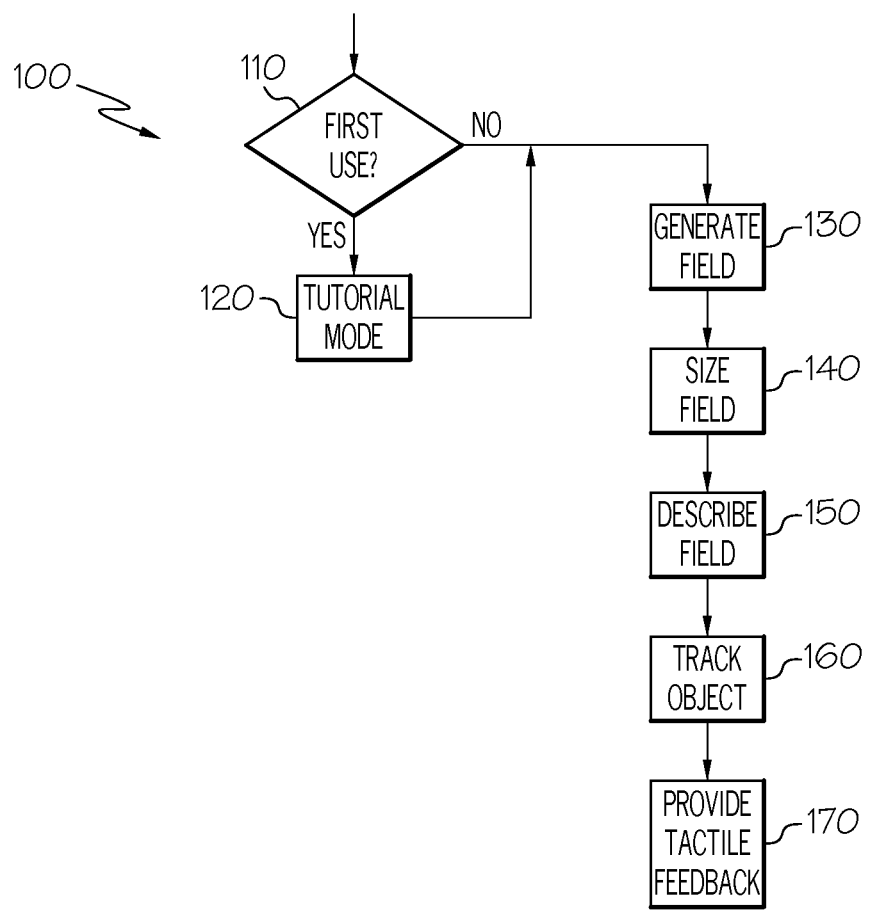
FIG. 3 is a flow chart illustrating a method of tracking objects and providing visual feedback, in accordance with an aspect of an exemplary embodiment.

Reference will now follow to FIG. 3 in describing a method 100 of tracking objects and providing tactile feedback, in accordance with an exemplary embodiment. In block 110, a determination is made whether accessing object detection and tactile feedback system 2 constitutes a first use. If a first use, the user is presented with a tutorial mode option in block 120. In the tutorial mode option, an audible feedback may be employed to help familiarize the user with various meanings associated with difference tactical feedbacks. Further, the user may be prompted to establish preferences for playing fields, feedback, and the like. For example, in the tutorial mode, a user may customize field preferences and/or feedback preferences. Customizing feedback preferences may include tailoring the type, intensity, frequency and/or duration of haptic feedback. If accessing object detection and tactile feedback system 2 is not a first use, or the user declines a tutorial, a field is generated in block 130.

The field may be one of a number of user selected options stored in memory 6, downloaded from the Internet, or the like. The type of field generated corresponds to a sporting event desired to be followed, in real-time, by the user. After being generated, if not already done so, the field may be sized to the user's hand in block 140 and described to the user in block 150. The user may be provided with a number of haptic feedback responses that provide a tactile description, location of goals, boundaries, finish lines and the like, while also sizing the field to the user's hand. The user may adjust the location of boundaries in order to match hand size or accommodate other issues/concerns.

In block 160 object tracking begins and, in block 170, haptic feedback is provided to the user through touch screen display 46 denoting movement of the object relative to the field. Haptic feedback may take the form of vibrations, but could also take on other forms of haptic feedback provided to a user. The use may also be presented with a plurality of distinct tactile feedbacks that could denote multiple, different, objects such as favorite players, cars, runners, as well as playing objects such as balls, pucks, and the like. Further, special forms of haptic feedback may also be provided. That is, in the event of, for example, a score, slam dunk, or other special event, haptic feedback may be more intense. Haptic feedback may also include a screen wide sensation to denote crowd excitement and the like. Further, object detection and tactile feedback system 2 may track a game clock, or the like, to pause feedback or provide a special feedback during time-outs or other pauses in action.

At this point, it should be understood that exemplary embodiments provide a system for tracking objects and providing visually impaired users with real-time tactile feedback. The system may be employed in a wide array of events and should not be considered to be limited to professional sports, college sports, and the like. Further, object tracking should be understood to include remotely tracking objects such as balls, pucks, people, cars and the like, and/or employing a transmitter embedded in the object(s). It should also be understood that the number of tracked objects may vary. In addition, it should be understood that the exemplary embodiments could also include a glove that secures the tactile feedback device to a user's hand. The device may simply support the device or enhance haptic feedback.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tracking objects comprising:
sensing, with a processor, at least one object;
determining, with the processor, a position of the at least one object relative to a playing field;
presenting the portion of the playing field on a feedback device;
selectively adjusting a size of the portion of the playing field presented on the feedback device relative to a user's hand; and
providing, through the feedback device, at least one tactile feedback presenting the position of the at least one object relative to the portion of the playing field.

2. The method of claim 1, wherein sensing the at least one object includes remotely detecting one of a ball, a puck, and a person.

3. The method of claim 1, wherein sensing the at least one object includes receiving a signal from a transmitter associated with the at least one object.

4. The method of claim 1, wherein sensing the at least one object includes receiving a signal from a transmitter embedded within the at least one object.

5. The method of claim 1, wherein presenting the playing field includes displaying a playing field.

6. The method of claim 5, further comprising: providing a tactile feedback to a user to identify portions of the playing field.

7. The method of claim 1, further comprising: providing a tutorial mode wherein tactile feedback is provided along with an audible feedback.

8. The method of claim 1, wherein sensing the at least one object includes sensing a plurality of objects.

9. The method of claim 8, wherein providing the at least one tactile feedback includes providing a plurality of distinct tactile feedbacks through the feedback device, each of the plurality of distinct tactile feedbacks being associated with one of the plurality of objects.

10. A computer program product for tracking objects and providing tactile feedback comprising a non-transitory computer readable storage medium having computer readable program code embodied therewith, the computer readable program code, when executed by a processor, causing the processor to:
sense, with the processor, at least one object;
determine, with the processor, a position of the at least one object relative to a playing field;
present the playing field on a feedback device;
selectively adjusting a size of the portion of the playing field presented on the feedback device relative to a user's hand; and
provide, through the feedback device, at least one tactile feedback presenting the position of the at least one object relative to the playing field.

11. The computer program product according to claim 10, wherein the computer readable program code, when executed by a processor, causes the processor to: remotely detect one of a ball, a puck, and a person.

12. The computer program product according to claim 10, wherein the computer readable program code, when executed by a processor, causes the processor to: receive a signal from a transmitter associated with the at least one object.

13. The computer program product according to claim 10, wherein the computer readable program code, when executed by a processor, causes the processor to: receive a signal from a transmitter embedded within the at least one object.

14. The computer program product according to claim 10, wherein the computer readable program code, when executed by a processor, causes the processor to: present the playing field on the feedback device.

15. The computer program product of claim 14, wherein the computer readable program code, when executed by a processor, causes the processor to: provide a tactile feedback to a user to identify portions of the playing field.

16. The computer program product according to claim 10, wherein the computer readable program code, when executed by a processor, causes the processor to: provide a tutorial mode wherein tactile feedback is provided along with an audible feedback.

17. The computer program product according to claim 10, wherein the computer readable program code, when executed by a processor, causes the processor to: sense a plurality of objects.

18. The computer program product according to claim 17, wherein the computer readable program code, when executed by a processor, causes the processor to: provide a plurality of distinct tactile feedbacks through the feedback device, each of the plurality of distinct tactile feedbacks being associated with one of the plurality of objects.

* * * * *